United States Patent
Zu et al.

(10) Patent No.: US 10,574,126 B2
(45) Date of Patent: Feb. 25, 2020

(54) LINEAR VIBRATION MOTOR

(71) Applicant: GOERTEK INC., WeiFang, Shandong (CN)

(72) Inventors: Fenglei Zu, WeiFang (CN); Bin Wang, WeiFang (CN)

(73) Assignee: GOERTEK INC., Weifang, Shandong (CN)

( * ) Notice: Subject to any disclaimer, the term of this patent is extended or adjusted under 35 U.S.C. 154(b) by 101 days.

(21) Appl. No.: 15/749,834

(22) PCT Filed: Nov. 13, 2015

(86) PCT No.: PCT/CN2015/094520
§ 371 (c)(1),
(2) Date: Feb. 2, 2018

(87) PCT Pub. No.: WO2017/049747
PCT Pub. Date: Mar. 30, 2017

(65) Prior Publication Data
US 2018/0226869 A1   Aug. 9, 2018

(30) Foreign Application Priority Data
Sep. 23, 2015   (CN) .......................... 2015 1 0613333

(51) Int. Cl.
*H02K 33/18* (2006.01)
*H02K 33/16* (2006.01)

(52) U.S. Cl.
CPC ............ *H02K 33/18* (2013.01); *H02K 33/16* (2013.01)

(58) Field of Classification Search
CPC ........ H02K 7/061; H02K 7/063; H02K 33/00; H02K 35/00; H02K 33/18; H02K 33/16;
(Continued)

(56) References Cited

U.S. PATENT DOCUMENTS 7,078,832 B2 *   7/2006   Inagaki ................ F04B 35/045
                                                                310/12.19
7,474,018 B2 *   1/2009   Shimizu ............. A61C 17/3445
                                                                310/12.22
(Continued)

FOREIGN PATENT DOCUMENTS

CN       101795048 A     8/2010
CN       102570764 A     7/2012
(Continued)

OTHER PUBLICATIONS

International Search Report, SIPO, dated Jun. 22, 2015.
(Continued)

*Primary Examiner* — Jermele M Hollington
*Assistant Examiner* — Ahmed Elnakib
(74) *Attorney, Agent, or Firm* — Holzer Patel Drennan

(57) ABSTRACT

Disclosed is a linear vibration motor comprising a vibrator and a stator arranged parallel to the vibrator. The vibrator comprises a counterweight block and a vibration block embedded and fixed in the counterweight block. The vibration block comprises at least two permanent magnets. The stator comprises a coil. A magnetic conductive core is arranged in the coil. The adjacent end surfaces of the at least two adjacent permanent magnets form slopes parallel to each other. The slopes form an acute angle with the axis of the magnetic conductive core. The slopes extend obliquely in the direction approaching the corresponding magnetic conductive core. The motor not only ensures the maximization of the sizes of the permanent magnets, but also increases the effective magnetic field intensity between a gap between the adjacent permanent magnets and the magnetic conductive core, thus increasing a driving force driving the vibrator into vibration.

8 Claims, 3 Drawing Sheets

(58) Field of Classification Search
CPC ......... B06B 1/04; B06B 1/045; B06B 1/0245; B06B 1/0246; B06B 1/0253; B06B 1/0261
USPC ..... 310/19, 25, 12.16, 12.25, 15, 21, 29, 32, 310/36, 81
See application file for complete search history.

(56) References Cited

U.S. PATENT DOCUMENTS

| | | | | |
|---|---|---|---|---|
| 8,242,642 | B2* | 8/2012 | Odajima | H02K 33/16 310/15 |
| 2010/0231060 | A1* | 9/2010 | Bang | H02K 5/225 310/25 |
| 2011/0012441 | A1* | 1/2011 | Oh | B06B 1/045 310/25 |
| 2012/0112565 | A1* | 5/2012 | Lee | B06B 1/045 310/20 |
| 2012/0169148 | A1* | 7/2012 | Kim | H02K 33/16 310/25 |
| 2012/0227269 | A1* | 9/2012 | Subramanian | B26B 19/282 30/210 |
| 2013/0169041 | A1* | 7/2013 | Fukaya | B60R 16/0215 307/10.1 |
| 2014/0265650 | A1* | 9/2014 | Jeon | H02K 33/16 310/25 |
| 2015/0349619 | A1* | 12/2015 | Degner | H02K 41/0356 310/12.21 |

FOREIGN PATENT DOCUMENTS

| | | |
|---|---|---|
| CN | 103683793 A | 3/2014 |
| CN | 204205909 U | 3/2015 |
| CN | 204334277 U | 5/2015 |
| CN | 205356110 U | 6/2016 |
| EP | 0580117 A2 | 1/1994 |
| JP | 2007282475 A | 10/2007 |
| KR | 20100046600 A | 5/2010 |
| KR | 10-2012-0056623 * | 6/2012 |

OTHER PUBLICATIONS

Office Action in Priority Application No. 20150613333.6, Intellectual Property Office of the P.R. China, dated Sep. 28, 2017.

* cited by examiner

LINEAR VIBRATION MOTOR

TECHNICAL FIELD

The present invention relates to the technical field of electro-acoustics, in particular to a linear vibration motor.

BACKGROUND

With the development of communication technology, the portable electronic products, such as mobile phones, handheld game consoles or handheld multimedia entertainment devices, etc. are gradually getting closer to people's lives. In these portable electronic products, the micro-vibration motor is generally used for system feedback, in the case of the mobile phones, if a user is in some important occasions such as a meeting room or a classroom, on the one hand, the user hopes to receive the information feedback of the message or the call instantly, and on the other hand, the voice reminder function will not be turned on because of the seriousness of the occasions, and the utilization of the vibration of a micro-vibration motor to make information feedback can easily meet the above two requirements.

The current micro-vibration motor is usually a linear vibration motor, after the coil is energized, the stator will be driven by Lorentz force driving the stator to move, and the vibrator is subject to the force in the opposite direction by means of the relationship between force and reaction force, then the vibrator makes a linear vibration under the influence of this force. However, in the conventional linear vibration motor, since the magnetic induction lines produced by the permanent magnet itself in the vibrator are dispersed comparatively and cannot be fully utilized, the magnetic flux across the coil will be relatively small, and the force generated will be relatively small, which will affect the vibration sense. On the other hand, in the process of trying to drive the motor to vibrate by using the interaction of the electromagnet and the permanent magnet, for some structures adopting two or more permanent magnets, if the method of horizontal magnetization is still adopted and no change is made to the shape of the permanent magnet, the effective magnetic field strength between a gap between the permanent magnets and the magnetic conductive core in the electromagnet is relatively weak. Therefore, it is necessary to solve the problems that the weakness of the effective magnetic field and the insufficient driving force of the existing linear vibration motor.

SUMMARY

The technical problem sought to be solved by the present invention is to provide a novel structure of a linear vibration motor, on the one hand, by arranging the pair of magnets and adding the magnetic conductive core inside the coil, the magnetic field strength is increased and the driving force is improved by means of interaction between the electromagnet and permanent magnet; on the other hand, by arranging the permanent magnet having a special-shaped structure and using the oblique magnetization, the effective magnetic field strength can be increased as much as possible, and the driving force is further improved.

In order to achieve the above objects, the present invention adopts the following technical solutions: a linear vibration motor, comprising a vibrator and a stator disposed in parallel with the vibrator, wherein the vibrator comprises a counterweight block and a vibration block embedded and fixed in the counterweight block, wherein the vibration block comprises at least two permanent magnets; the stator comprises a coil; a magnetic conductive core is accommodated in the coil; adjacent end surfaces of adjacent permanent magnets of the at least two permanent magnets form slopes parallel to each other, the slopes form acute angles with an axis of the magnetic conductive core; and the slopes extend obliquely to a direction approaching the corresponding magnetic conductive core.

As an improvement, the permanent magnets are magnetized in a direction perpendicular to the slopes.

As an improvement, polarities of magnetic poles at adjacent ends of the adjacent permanent magnets are the same; and a magnetic conductive yoke is disposed between the adjacent permanent magnets, and an inclined angle of the magnetic conductive yoke is the same as inclined angles of the corresponding slopes.

As an improvement, the magnetic conductive yoke between the adjacent permanent magnets and the magnetic conductive core in the coil are misaligned with each other; and an inclined direction of the magnetic conductive yoke directs to the corresponding magnetic conductive core.

As an improvement, the permanent magnets fixed to the counterweight block are three permanent magnets comprising a first permanent magnet, a second permanent magnet and a third permanent magnet, and the three permanent magnets together form a first magnet portion; and each of the first permanent magnet and the third permanent magnet has a parallelogram structure, and the second permanent magnet has a trapezoidal structure.

As an improvement, the first permanent magnet, the second permanent magnet and the third permanent magnet respectively comprise a slope; and adjacent slopes jointly correspond to one magnetic conductive core, and each of the slopes is inclined to the corresponding magnetic conductive core.

As an improvement, the coil and the magnetic conductive core accommodated in the coil form an electromagnet; and the electromagnet generates a varying magnetic field after being energized and drives the vibrator to do a reciprocating motion in a direction parallel to the stator by changing directions of magnetic induction lines of the magnetic field.

As an improvement, an end region of the counterweight block is coupled with a vibration supporting structure; the vibration supporting structure is a vibration guiding shaft; one end of the vibration guiding shaft is inserted into an accommodating hole located at an end of the counterweight block, and the other end of the vibration guiding shaft is fixed on an outer housing of the linear vibration motor; and the vibration guiding shaft is sleeved with a limit spring for providing elastic restoring force.

As an improvement, a corner of the counterweight block is provided with a second magnet portion, which comprises four elongated permanent magnets respectively embedded in four corners of the counterweight block; an auxiliary magnet is further provided, and the auxiliary magnet and the vibrator are spaced apart from each other by a certain distance in a vibration direction of the vibrator; and ends of the auxiliary magnet and the elongated permanent magnets close to each other have opposite polarities.

As an improvement, a concave hole is provided in a central position of the counterweight block; the permanent magnets and the magnetic conductive yoke located between the permanent magnets are accommodated in the concave hole; the permanent magnets and the magnetic conductive yoke are bonded as a whole and are fixed to the counterweight block by gluing; the counterweight block is provided with a avoiding structure for avoiding the stator at a position corresponding to the stator; the coil is connected and fixed to a flexible circuit board; and the flexible circuit board is connected to an external circuit of the linear vibration motor.

Compared with the prior art, the linear vibration motor of the present invention is provided with a magnetic conductive core in the coil to form an electromagnet structure. After the power is applied, the electromagnet generates a varying magnetic field and changes the direction of the magnetic induction lines, so that the magnetic induction lines are more concentrated to spread to the outside through the magnetic conductive core. The linear vibration motor of the present invention also has an improvement in the position relationship between the vibrator and the stator, which jumps out of the existing design idea of vertically placing the permanent magnet and the coil, and the permanent magnet of the vibrator is horizontally placed and parallel to the stator and the adjacent ends of the adjacent permanent magnets have the same polarity so as to concentrate the magnetic induction lines of the permanent magnets by means of the same-sex repulsion force, so that the stator can obtain a magnetic flux as large as possible and improve the driving force. More importantly, in the present invention, the permanent magnet is provided with a slope, that is, the permanent magnet has a special-shaped structure, which can make the effective magnetic field strength of oblique magnetized permanent magnet increase. When the direction of magnetization is the direction perpendicular to the slope, the maximization of the effective magnetic field can be achieved. In addition, the slope inclines in the direction approaching the corresponding magnetic conductive core, it can not only ensure the maximization of the size of the permanent magnet, but also ensure that the magnetic field extends towards the direction of the magnetic conductive core of the electromagnet, thereby maximally increasing the effective magnetic field intensity between a gap between the adjacent permanent magnets and the magnetic conductive core.

BRIEF DESCRIPTIONS OF THE DRAWINGS

FIG. 3-1 is a schematic diagram of the distribution of magnetic induction lines when the linear vibration motor coil of the present invention is not energized;

FIG. 3-2 is a schematic diagram of the working principle of the linear vibration motor coil of the present invention after the linear vibration motor coil is energized;

Figure 1:
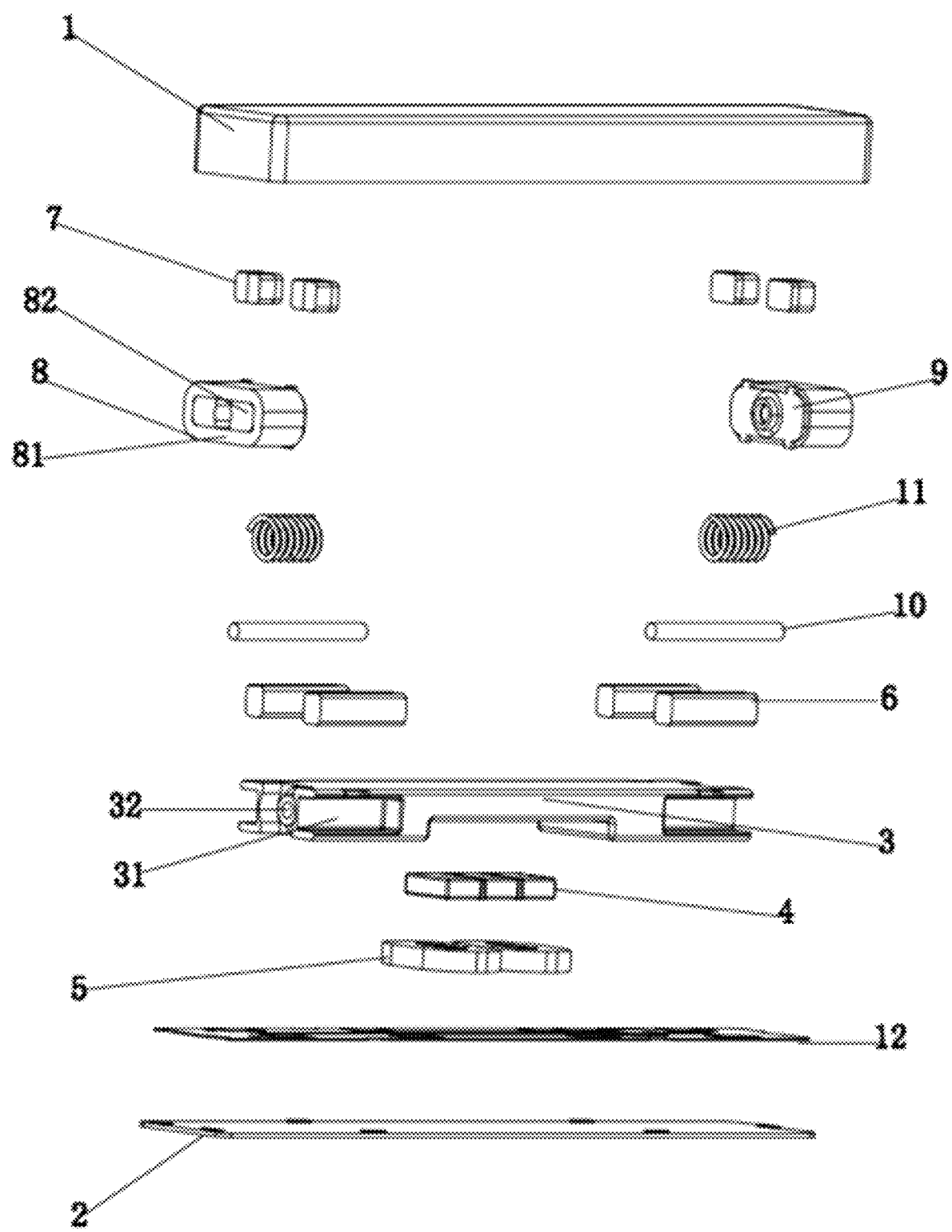
FIG. 1 is an exploded view of the linear vibration motor structure according to the present invention.

The reference numerals in the figures are as follows: upper housing 1, rear cover 2, counterweight block 3, elongated slot 31, accommodating hole 32, first magnet portion 4, first permanent magnet 41, slope 411, slope 412, second permanent magnet 42, slope 421, slope 422, third permanent magnet 43, slope 431, slope 432, first electromagnet 5, coil 51, magnetic conductive core 52, elongated permanent magnet 6, auxiliary magnet 7, second electromagnet 8, auxiliary coil 81, auxiliary magnetic conductive core 82, baffle 9, vibration guiding shaft 10, limit spring 11, flexible circuit board (FPCB) 12, magnetic conductive yoke 13.

DETAILED DESCRIPTIONS

Hereinafter, the contents of the present invention will be described in detail with reference to the accompanying drawings.

In the following description, for the purposes of explanation, numerous specific details are set forth in order to provide a thorough understanding of one or more embodiments. However, it is apparent that these embodiments may be practiced without these specific details.

Figure 2:
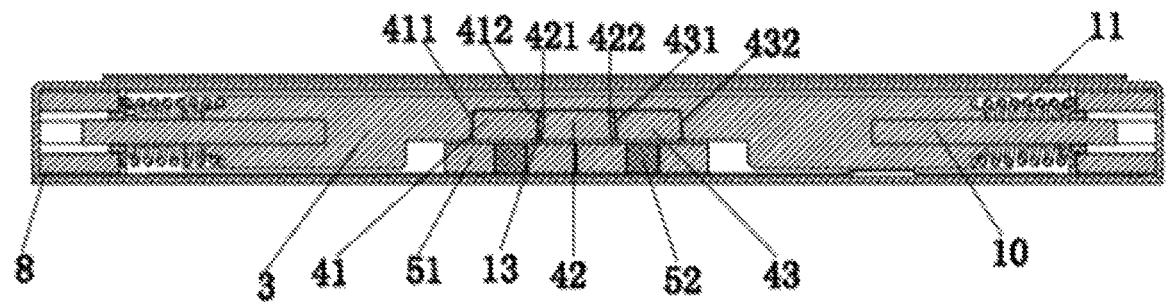
FIG. 2 is a schematic cross-sectional view of the linear vibration motor structure according to the present invention.

The "counterweight block" used for expressing the specific implementation method in the present invention may also be referred to as a "mass block", each of which refers to a high-mass, high-density metal block fixed to the permanent magnet that generates vibration so as to enhance vibration balance. The specific embodiments of the present invention will be described in detail below with reference to the accompanying drawings:

In view of the problem that the existing linear vibration motor has insufficient driving force, the linear vibration motor of the present invention utilizes the interaction between the electromagnet and the permanent magnet to drive the motor to vibrate. Referring to FIGS. 1 and 2, the linear vibration motor of the invention comprises an outer housing, the outer housing particularly comprises an upper housing 1 and a rear cover 2 which are combined together, and the upper housing 1 and the rear cover 2 cooperate with each other to form a cavity having an accommodating space. A vibrator and a stator are accommodated in the cavity, in practice, the stator is disposed in parallel to the vibrator, and both the stator and the vibrator are arranged in the vertical direction. Wherein, the vibrator comprises a counterweight block 3 and a vibration block embedded and fixed in the counterweight block 3, the vibration block comprises at least two permanent magnets (three in the present embodiment); and three permanent magnets together form a first magnet portion 4. In practice, a concave hole structure is provided in a central position of the counterweight block 3; the first magnet portion 4 is accommodated in the concave hole and fixed with the counterweight block 3 by applying glue. A magnetic conductive yoke 13 is provided between the adjacent permanent magnets, in practice, the magnetic conductive yoke 13 is bonded and fixed to the permanent magnet firstly, and then the assembly of the first magnet portion 4 and the magnetic conductive yoke 13 is integrally fixed with the counterweight block 3.

In the present invention, the stator system comprises a coil 51 coiled by winding, and the counterweight block 3 is correspondingly provided with an avoiding structure for avoiding the coil 51. The coil 51 accommodates magnetic conductive cores 52, the coil 51 is fixed to the FPCB (flexible circuit board) 12, and the FPCB 12 is connected to an external circuit. Therefore, the external current signal can be introduced into the coil 51. Since the magnetic conductive cores 52 are accommodated in the coil 51, the magnetic conductive cores 52 are magnetized when a current signal is passed through. The coil 51 and the magnetic conductive cores 52 serve as an electromagnet structure and interact with the first magnet portion 4 to urge the motor to vibrate.

As shown in FIG. 2, the first magnet portion 4 shown in the present embodiment specifically comprises three permanent magnets, i.e., a first permanent magnet 41, a second permanent magnet 42, and a third permanent magnet 43. In the present invention, in order to increase the effective magnetic field strength in a gap between the adjacent permanent magnets and between the magnetic conductive cores 52, the adjacent end surfaces of the adjacent permanent magnets form the slopes parallel to each other, the slopes form an acute angle with the axis of the magnetic conductive core (the axis of the magnetic conductive core as defined herein is the center axis passing through the magnetic conductive core, which is perpendicular to the mounting plane where the magnetic conductive core is located); and the slopes extend obliquely in the direction approaching the corresponding magnetic conductive core. Specifically in the present embodiment, each of the three permanent magnets in the first magnet portion 4 has a special-shaped structure. Each of the first permanent magnet 41 and the third permanent magnet 43 has a parallelogram shape and comprises slopes (411, 412 and 431, 432). The second permanent magnet 42 has a trapezoidal structure and comprises slopes 421 and 422. In the above slopes, the slopes 412 and 421 are the adjacent end surfaces of the first permanent magnet 41 and the second permanent magnet 42, the slopes 422 and 431 are the adjacent end surfaces of the second permanent magnet 42 and the third permanent magnet 43. The slope 412 and the slope 421 jointly correspond to one of the magnetic conductive cores 52 (on the left side in FIG. 2). The slope 422 and the slope 431 jointly correspond to the other one of the magnetic conductive cores 52 (on the right side in FIG. 2). Preferably, the above three permanent magnets adopt an oblique magnetization method, and the specific magnetization direction is a direction perpendicular to the corresponding slope, so that the maximization of the effective magnetic field strength can be easily achieved. At the same time, each slope is inclined towards the direction of the corresponding magnetic conductive core 52 so as to ensure that the magnetic field extends in the direction of the magnetic conductive core 52 while ensuring that the permanent magnet volume is maximized.

Figures 1, 3:
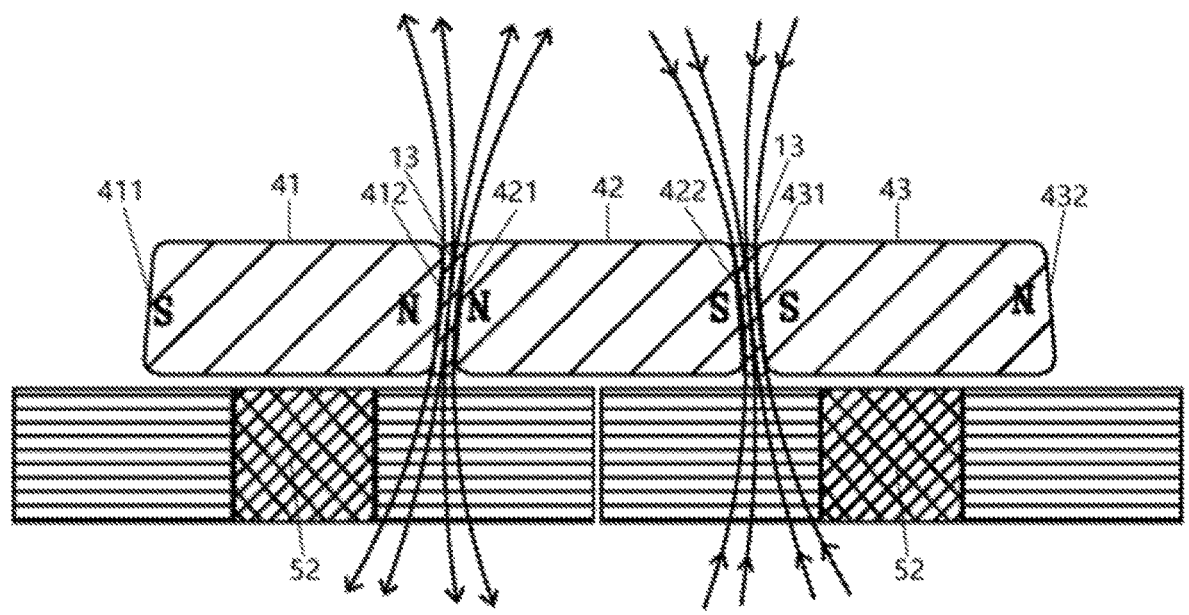
Figures 2, 3:
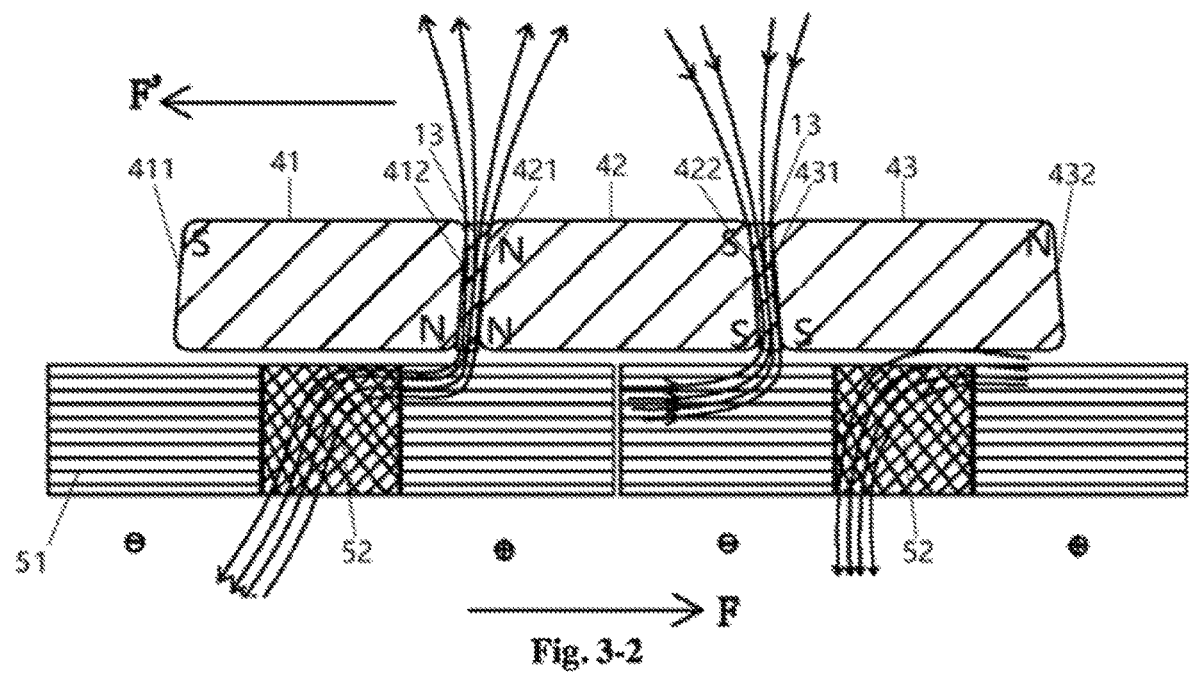

Referring to FIG. 3-1 and FIG. 3-2 together, in the present embodiment, the adjacent end faces of adjacent permanent magnets (the first permanent magnet 41 and the second permanent magnet 42, or the second permanent magnet 42 and the third permanent magnet 43) have the same magnetic pole (the same pole is N pole or S pole). The inclination angles of the two magnetic conductive yokes 13 have the same inclined angles as the slopes respectively corresponding to them, that is to say, the inclination angle of the magnetic conductive yoke located between the first permanent magnet 41 and the second permanent magnet 42 is the same as the inclination angle of the slope 412 and the slope 421, and the inclination angle of the magnetic conductive yoke located between the second permanent magnet 42 and the third permanent magnet 43 is the same as the inclination angle of the slope 422 and the slope 431. It is easy to understand that the magnetic conductive yoke 13 and the magnetic conductive core 52 in the coil 51 are arranged in a staggered manner, and the inclined direction of the magnetic conductive yoke 13 should be directed to the magnetic conductive core 52 corresponding to the magnetic conductive yoke 13.

It should be noted that the structure shown in FIG. 2 is only one embodiment of the present invention. In fact, the present technical solution can be applied to a structure with only two permanent magnets or two or more permanent magnets. In addition, the shape of the permanent magnet shown in the embodiment comprises a parallelogram and a trapezoidal structure, in specific implementations, the permanent magnet may be other special-shaped structures, which are not limited in particular by the above-mentioned schematic shapes.

The specific driving principle of the linear vibration motor of the present invention is as follows:

Referring to FIG. 3-1, in the linear vibration motor of the present invention, the adjacent ends of two adjacent permanent magnets in the first magnet portion 4 have the same polarity (horizontally magnetized pair of magnets), i.e., three permanent magnets are arranged in the sequence of S-N, N-S, S-N, of course, may also be arranged in the sequence of N-S, S-N, N-S, and the magnetic conductive yoke 13 is disposed between the adjacent permanent magnets. As shown in the figure, when the coil 51 is not energized, the first magnet portion 4 generates a static magnetic field, since the repulsive force is generated between the two ends of the same polarity of two adjacent permanent magnets, thereby creating very concentrated distribution of the magnetic induction lines. Referring to FIG. 3-2, when the coil 51 is energized, the coil 51 and the magnetic conductive core 52 as the electromagnet generates a varying magnetic field, and the varying magnetic field can change the direction of the magnetic induction lines, so that the magnetic induction lines are more concentrated to spread to the outside through the magnetic conductive core 52. In addition, the slope extends in the direction towards the corresponding magnetic conductive core, as a result, the effective magnetic field strength between the gap between the adjacent permanent magnets and the magnetic conductive core 52 is increased, and the distribution of the magnetic induction lines are more concentrated. The magnetic conductive core 52 and the magnetic conductive yoke 13 are disposed at a distance in the horizontal direction so that when the coil 51 is energized, the electromagnet generates attractive or repulsive force to the permanent magnet, and magnetic induction lines can be more concentratedly transmitted to the outside through the magnetic conductive core 52.

According to the left hand rule (Ampere rule) for determining the direction of the force that the energized conductor is subjected to in the magnetic field, the left hand is stretched out, so that the thumb is perpendicular to the remaining four fingers, and all of the fingers are in the same plane with the palm; then the magnetic induction lines enter into the centre of the palm and the four fingers point to the current direction, at this moment, the direction of the thumb is the direction of the Ampere force that the energized conducting wire is subjected to in the magnetic field. At a certain moment, for the current direction in the coil 51, assuming that "⊖" indicates the inward direction perpendicular to the drawing plane, and "⊗" indicates the outward direction perpendicular to the drawing plane. Since the coil shown in this embodiment comprises two coils, it is assumed that the first coil is "⊖ and ⊗", and the second coil must also be "⊖ and ⊗". At this moment, it is determined that the coil 51 is subjected to the rightward force F according to Ampere rule, since the coil 51 is fixed to FPCB, based on the relationship between the action force and the reaction force, the first magnet portion 4 is subjected to the reverse force F' (horizontally to left). In this way, the first magnet portion 4, which is pushed to the left by the leftward force, drives the counterweight block 3 together to move to the left. Similarly, when the current direction is changed, the direction of the magnetic field force F that the coil 51 is subjected to is the leftward direction according to the left-hand rule, and the force F' that the first magnet portion 4 is subjected to is opposite to the direction of the force F and has the same magnitude as the force F, and drives the counterweight block 3 together to move to the right. The above-mentioned motions are carried out alternately, so that the vibration block composed of the first magnet portion 4 and the magnetic conductive yoke 13 form a linear reciprocating motion parallel to the stator with the counterweight block 3 together.

It should be noted that, because two parts of electromagnet structures with different functions are provided in the present embodiment, in order to make it easy to distinguish, the electromagnet (that is, the coil 51 and the magnetic conductive core 52 in the stator) used for driving is named as the first electromagnet, and the electromagnets located in the two end regions of the motor are named as the second electromagnet.

The vibration motor of the present invention further comprises a vibration supporting structure, and the vibration supporting structure is a vibration guiding shaft 10. An accommodating hole 32 for accommodating the vibration guiding shaft is provided in an end region of the counterweight block 3, and one end of the vibration guiding shaft 10 is inserted into the accommodating hole 32. The vibration guiding shaft 10 is sleeved with a limit spring 11. If the vibrator moves leftward, the limit spring on the left side of the counterweight block 3 will be squeezed and the limit spring on the right side will be stretched, otherwise, the limit spring on the right side of the counterweight block 3 will be squeezed while stretching the limit spring on the left side, then the limit springs 11 provide elastic restoring force for vibrator vibration.

In addition, the linear vibration motor of the present invention is also provided with a magnetic balance structure, which is specifically described as follows:

The four corner regions of the counterweight block 3 are respectively provided with an elongated slot 31. Four elongated permanent magnets 6 are respectively accommodated in the four elongated slots 31. The four elongated permanent magnets 6 together form a second magnet portion. The elongated permanent magnet 6 is arranged at the corner mainly for keeping the balance as possible, and at the same time, it is necessary to ensure that the elongated permanent magnet 6 has a large magnetic energy product so as to ensure the balance force. While the auxiliary magnet 7 is mounted on both sides of the vibration block, the distance between the auxiliary magnet 7 and the elongated permanent magnet 6 should be as small as possible to ensure sufficient balance force, at the same time, the avoidance of the vibration space must be taken into account. In the linear vibration motor of the present invention, the structure of the second electromagnet 8 is provided on both end sides of its long axis, and the second electromagnet 8 comprises an auxiliary coil 81 and an iron core 82 accommodated in the auxiliary coil 81. The second electromagnet 8 is coupled with a baffle 9 at one end close to the vibrator. The baffle 9 separates the vibrating area of the vibrator from the auxiliary coil 81 so as to prevent the vibrator from colliding with the auxiliary coil 81 and resulting in damage due to the excessive amplitude of the vibrator. It is to be explained that the baffle 9 described herein is preferably the magnetic conductive material.

Figure 4:
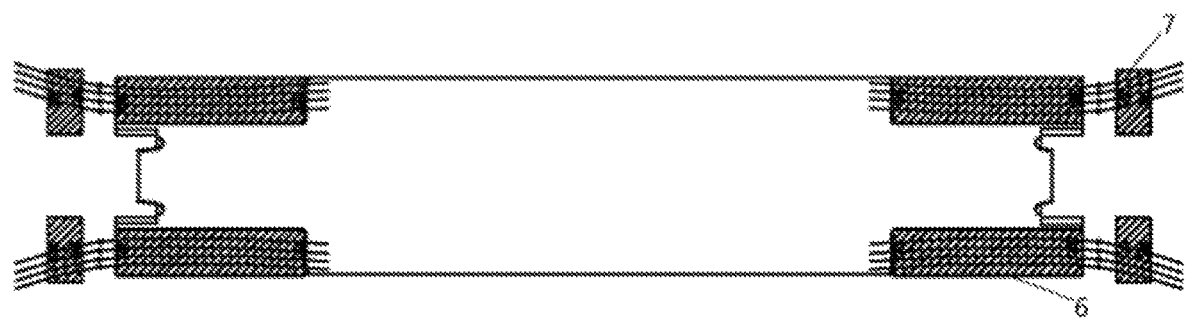
FIG. 4 is a schematic diagram of the magnetic balance principle of the linear vibration motor according to the present invention.

Referring to FIG. 4, a horizontal grasping force is exerted on the vibration block by utilizing the attractive force between the elongated permanent magnet 6 and the auxiliary magnet 7. When the vibration block deflects, the grasping force will change into the restoring force that is opposite to the deflection direction, thus achieving the balance of the vibration block. In this process, it must be satisfied that the polarities of the adjacent ends of the auxiliary magnets 7 and the adjacent elongated permanent magnets 6 are opposite. As shown in the figure, the polarity of the elongated permanent magnet 6 located on the left is N-S, then the order of the polarity of the auxiliary magnet 7 can only be N-S. The S pole of the auxiliary magnet and the N pole of the elongated permanent magnet 6 attract each other to generate a leftward grasping force; similarly, the structure and principle of the magnetic balance on the right are referenced to the description on the left, and will not be repeated here.

Preferably, the magnetic conductive core 52 and the auxiliary magnetic conductive core 82 are preferably iron cores.

Preferably, a side of the auxiliary magnet 7 adjacent to the vibrator is provided with a buffer pad, which is preferably an elastic material, so as to avoid mechanical collision of the vibrator with the auxiliary magnet 7 when the vibrator vibrates.

Preferably, one end of the vibration guiding shaft 10 is inserted into the accommodating hole 32 of the counterweight block 3, and the other end of the vibration guiding shaft 10 passes through the baffle 9 and is fixed to the upper housing 1, that is, the counterweight block 3 is actually fixed on the outer housing through the vibration guiding shafts 10 at two ends thereof.

Preferably, the edge of the FPCB 12 is provided with a plurality of grooves, and the position of the rear cover 2 corresponding to the groove is provided with a matching snap structure, and the FPCB 12 is firmly fixed with the back cover 2 through the groove and the snap structure.

The above mentioned are only embodiments of the present invention and are not for limiting the present invention, thus the equivalent modification or variation made by those skilled in the art according to the present invention should be incorporated into the protection scope recorded in the claims.

What is claimed is:

1. A linear vibration motor, comprising a vibrator and a stator disposed in parallel with the vibrator, wherein the vibrator comprises a counterweight block and a vibration block embedded and fixed in the counterweight block, wherein the vibration block comprises at least two permanent magnets; the stator comprises a coil; a magnetic conductive core is accommodated in the coil; adjacent end surfaces of adjacent permanent magnets of the at least two permanent magnets form slopes parallel to each other, and the slopes form acute angles with an axis of the magnetic conductive core; and the slopes extend obliquely to a direction approaching a corresponding magnetic conductive core, wherein the permanent magnets are magnetized in a direction perpendicular to the slopes;

wherein a magnetic conductive yoke between the adjacent permanent magnets and the magnetic conductive core in the coil are misaligned with each other; and an inclined direction of the magnetic conductive yoke directs to the corresponding magnetic conductive core.

2. The linear vibration motor according to claim 1, wherein polarities of magnetic poles at adjacent ends of the adjacent permanent magnets are the same; and a magnetic conductive yoke is disposed between the adjacent permanent magnets, and an inclined angle of the magnetic conductive yoke is the same as inclined angles of corresponding slopes.

3. The linear vibration motor according to claim 1, wherein the permanent magnets fixed to the counterweight block are three permanent magnets comprising a first permanent magnet, a second permanent magnet and a third permanent magnet, and the three permanent magnets together form a first magnet portion; and each of the first permanent magnet and the third permanent magnet has a parallelogram structure, and the second permanent magnet has a trapezoidal structure.

4. The linear vibration motor according to claim 3, wherein the first permanent magnet, the second permanent magnet and the third permanent magnet respectively comprise a slope; and adjacent slopes jointly correspond to one magnetic conductive core, and each of the slopes is inclined to the corresponding magnetic conductive core.

5. The linear vibration motor according to claim 1, wherein the coil and the magnetic conductive core accommodated in the coil form an electromagnet; and the electromagnet generates a varying magnetic field after being energized and drives the vibrator to do reciprocating motion in a direction parallel to the stator by changing directions of magnetic induction lines of the magnetic field.

6. The linear vibration motor according to claim 1, wherein an end region of the counterweight block is coupled with a vibration supporting structure; the vibration supporting structure is a vibration guiding shaft; one end of the vibration guiding shaft is inserted into an accommodating hole located at an end of the counterweight block, and another end of the vibration guiding shaft is fixed on an outer housing of the linear vibration motor; and the vibration guiding shaft is sleeved with a limit spring for providing elastic restoring force.

7. The linear vibration motor according to claim 1, wherein a corner of the counterweight block is provided with a second magnet portion, which comprises four elongated permanent magnets respectively embedded in four corners of the counterweight block; an auxiliary magnet is further provided, and the auxiliary magnet and the vibrator are spaced apart from each other by a certain distance in a vibration direction of the vibrator; and ends of the auxiliary magnet and the elongated permanent magnets close to each other have opposite polarities.

8. The linear vibration motor according to claim 1, wherein: a concave hole is provided in a central position of the counterweight block; the permanent magnets and a magnetic conductive yoke located between the permanent magnets are accommodated in the concave hole; the permanent magnets and the magnetic conductive yoke are bonded as a whole and are fixed to the counterweight block by gluing; the counterweight block is provided with an avoiding structure for avoiding the stator at a position corresponding to the stator; the coil is connected and fixed to a flexible circuit board; and the flexible circuit board is connected to an external circuit of the linear vibration motor.

* * * * *